Sept. 19, 1939.    M. C. HUTTO    2,173,115
COMBUSTION APPARATUS
Filed Aug. 21, 1934    5 Sheets-Sheet 1

Fig.1.

INVENTOR
Marsden C. Hutto
BY
Pope and Pope
ATTORNEY

Sept. 19, 1939. M. C. HUTTO 2,173,115
COMBUSTION APPARATUS
Filed Aug. 21, 1934 5 Sheets-Sheet 2

INVENTOR
Marsden C. Hutto
BY Popp and Popp
ATTORNEYS

Sept. 19, 1939.  M. C. HUTTO  2,173,115
COMBUSTION APPARATUS
Filed Aug. 21, 1934  5 Sheets-Sheet 3

Fig. 8.

INVENTOR
Marsden C. Hutto
BY
Popp and Popp
ATTORNEYS

Sept. 19, 1939.　　　　M. C. HUTTO　　　　2,173,115
COMBUSTION APPARATUS
Filed Aug. 21, 1934　　　　5 Sheets-Sheet 4

INVENTOR
Marsden C. Hutto
BY
Popp and Popp
ATTORNEYS

Sept. 19, 1939. M. C. HUTTO 2,173,115
COMBUSTION APPARATUS
Filed Aug. 21, 1934 5 Sheets-Sheet 5

INVENTOR
Marsden C. Hutto
BY
Pogge and Pogge
ATTORNEYS

Patented Sept. 19, 1939

2,173,115

UNITED STATES PATENT OFFICE 2,173,115

COMBUSTION APPARATUS

Marsden C. Hutto, Grosse Pointe, Mich., assignor to Pressure Generators, Inc.

Application August 21, 1934, Serial No. 740,771

10 Claims. (Cl. 158—1)

This invention relates to combustion apparatus for the production of steam pressure for either heating or power purposes, although the invention can also be used to heat water to temperatures below the boiling point, and more particularly to such apparatus in which fuel and air or oxygen are admitted to a combustion chamber, ignition and expansion of the fuel taking place in this combustion chamber and the products of combustion flowing out in a steady, non-pulsating stream, a water jacket being provided around the combustion chamber and exhaust pipe in which the steam or hot water is developed.

This application is a continuation in part of my co-pending application now Patent No. 2,075,849, dated April 6, 1937.

The objects of the invention are to provide an efficient combustion apparatus which will continue to operate at full efficiency for a long time and contains no internal moving parts; in which the combustion takes place in a continuous, non-pulsating stream; which is positively limited in its operating pressure and hence safe; in which the combustion is produced under sub-atmospheric conditions and in a combustion chamber of adequate size and adequately insulated to insure good combustion; in which proper combustion is provided and the danger of backfire eliminated by feeding the fuel as an excessively rich mixture and diluting this in the combustion chamber; in which desired turbulence is set up in the combustion chamber to insure good combustion; in which carbonization of the spark plug is avoided and the spark plug adequately cooled; in which complete combustion is insured by admitting the fuel to the bottom of the combustion chamber by properly proportioning its outlet and by directing this outlet downwardly; in which the air is preheated and the heat of the exhaust gas absorbed to contract the exhaust gases and reduce the volume to be handled by the exhausting device; and in which the operation can be controlled entirely automatically.

The form of the invention shown in Figs. 1–7 comprises a casing formed to provide an enlarged insulated combustion chamber which exhausts into a secondary uninsulated radiating chamber preferably of equal size, both being surrounded by a water jacket, the fuel and air being admitted at the bottom of the combustion chamber and the products of combustion being withdrawn from the top of the radiating chamber through tubes which connect with a manifold which in turn is exhausted by means of an electric blower or fan. The combustion chamber and radiating chamber are formed of three casing members comprising a lower bowl-shaped casing member 20, an intermediate casing member 21 and an upper casing member 22. The intermediate casing member comprises a central part 23 of cylindrical form from the lower end of which an annular flange 24 projects outwardly and from the upper end of which an annular flange 25 projects outwardly. An annular manifold 26 is formed on the upper side of the lower annular flange 24 and this manifold is connected to the upper annular flange 25 by a plurality of integral tubes 27. The upper section 22 of the casing is generally of dome-shape suitably reinforced by ribs 28 and the rim of this upper section 22 is securely fastened to the rim of the upper annular flange 25 by any suitable means so that the products of combustion are free to pass from the cylindrical portion 23 of the central casing section 21 through the upper casing section 22 and down through the tubes 27 into the manifold 26.

Figure 1:
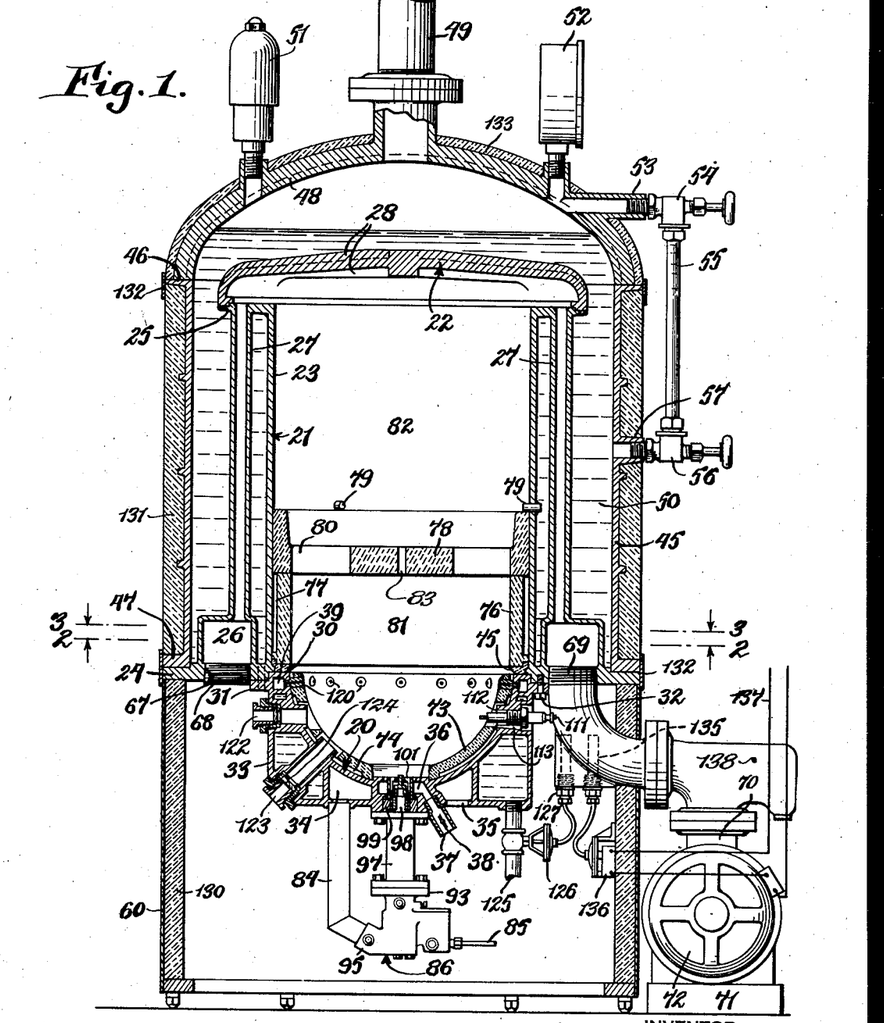
Fig. 1 is a vertical central section through a combustion apparatus embodying the preferred form of my invention.

The lower casing section 20 is generally of bowl-shaped form and is provided with an annular outwardly projecting flange 31 at its upper end through which cap screws 32 extend which secure the lower casing section to the intermediate casing section. The lower casing section is water jacketed, as indicated at 33, and is also formed to provide a primary air chamber 34 having an inlet 35; a secondary air chamber 36 having an air inlet 37 under control of a butterfly valve 38 and a third air inlet chamber 39 having an inlet 40 under control of a butterfly valve 41.

A cylindrical shell 45 having upper and lower flanges 46 and 47 surrounds and jackets the combustion chamber, the lower flange 47 being secured to the lower flange 24 of the intermediate section 21 in any suitable manner for this purpose. To the upper flange 46 of the shell 45 is suitably secured a dome 48 which is formed to provide a steam or water outlet 49 for the steam or hot water in the space 50 between the outer shell and the combustion chamber casing. The dome 48 preferably carries a safety valve 51, a pressure gage 52 and is formed to provide a boss 53 which carries the upper fitting 54 of a level gage glass 55, the lower fitting 56 of this gage being carried by a boss 57 in the cylindrical shell 45.

The structure described can be supported in any suitable manner, but is shown as carried by a cylindrical base section 60 to which the lower flange 24 of the intermediate casing section 21 is secured, this base section 60 being supported by feet or in any other suitable manner and preferably being provided with doors (not shown) through which access can be had to the peepholes, carburetor and the automatic control equipment which are housed within the base section.

In order to obtain access to each of the tubes 27 for the purpose of cleaning the same the lower flange 24 of the intermediate section is provided with a plurality of holes 65 each being in line with a corresponding tube 27 and closed by a plug 66 so that upon removal of the plugs the tubes can be cleaned. In addition this lower flange 24 is provided with four large openings 67, three of these being plugged with large plugs 68 and the fourth having an exhaust pipe 69 secured therein. This exhaust pipe 69 is shown as being in the form of an elbow, the lower end of which projects outwardly through the base 60 and connects with the inlet 70 of a suction fan 71 which is driven by an electric motor 72.

An important feature of the present invention consists in lining the combustion chamber with a refractory insulating material which prevents the dissipation of heat and insures the maintenance of high temperatures within the combustion chamber, this being essential to the efficient operation of the combustion apparatus. For this purpose the lower casing section 20 is provided with a cup-shaped liner 73 of a refractory material, a space 74 being provided between this material and the lower casing section. In addition, a ring of refractory cement 75 is provided on a shoulder 30 at the upper end or rim of the bowl shaped lower section 20 and on this cement is supported a sleeve 76 of refractory material, this sleeve being likewise spaced from the adjacent cylindrical wall 23, as illustrated at 77. On the sleeve 77 is supported a disk 78 of refractory material, this disk being preferably of substantial thickness and having its rim fitting against the cylindrical wall 23. This disk is preferably held down by a plurality of pins 79 which extend through the cylindrical wall 23 and are welded in place. Adjacent its rim the disk 78 is provided with a plurality of slots or holes 80 which permit the products of combustion to escape from the completely insulated combustion chamber 81 into the uninsulated radiating chamber 82. These slots 80 are radially disposed and are preferably equal in number to and somewhat larger than the tubes 27 so as to provide greater free area through the plate 78 than through the tubes 27. These slots also are not vertical but are arranged at an angle of 30° and are helically disposed with reference to the axis of the combustion chamber so that the hot gases passing therethrough are deflected to traverse a helical path and on entering the radiating chamber 82 are not only thrown outwardly by the centrifugal force against the uninsulated cylindrical side of the radiating chamber but also traverse these walls at high velocity so as to increase the heat transfer through these walls. The disk 78 is also preferably provided with a very small central hole 83 so as to avoid any possibility of the formation of dead gas pockets on either the upper or lower sides of the disk.

Figures 2, 3, 4, 5, 6, 7:
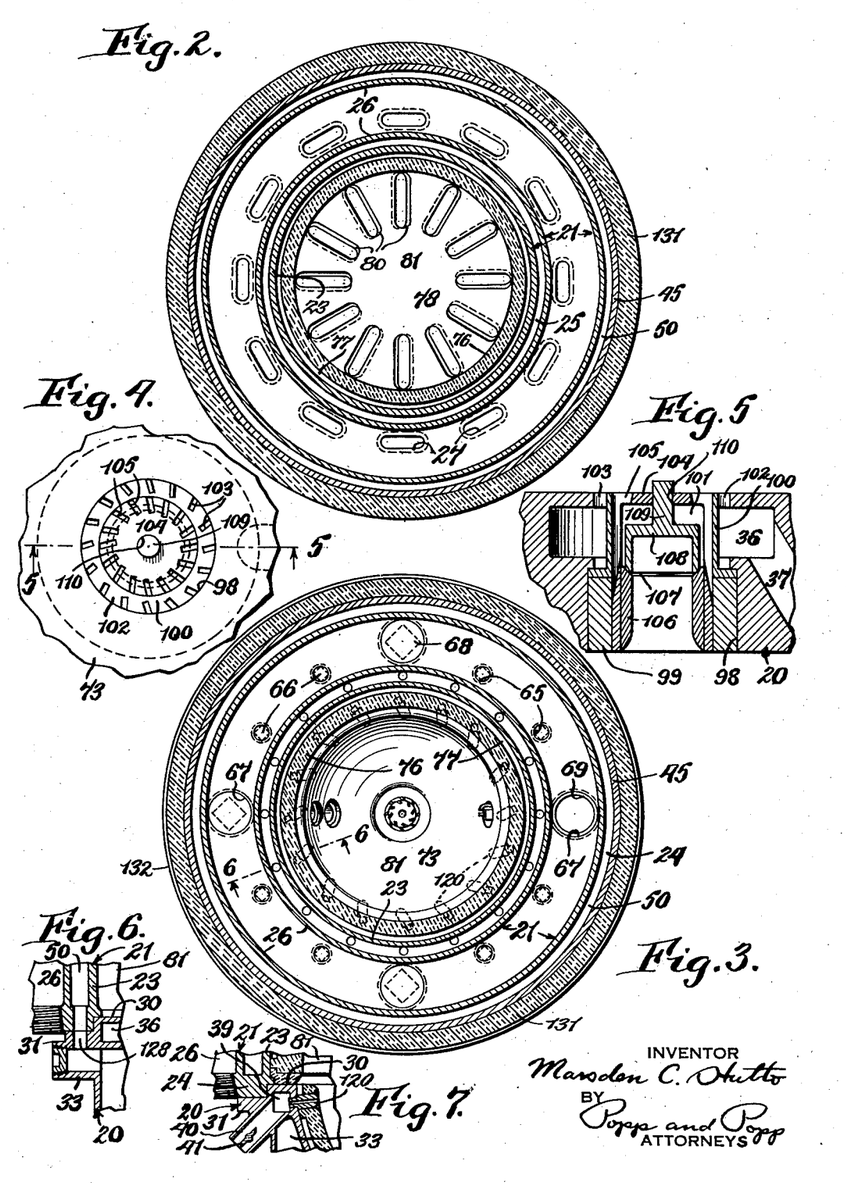
Figs. 2 and 3 are horizontal sections taken on the correspondingly numbered lines of Fig. 1.
Fig. 4 is a fragmentary view, on an enlarged scale, similar to Fig. 3 and showing the fuel head at the bottom of the combustion chamber.
Fig. 5 is an enlarged fragmentary view similar to Fig. 1 and showing, in detail, the fuel inlet head and associated parts.
Fig. 6 is an enlarged fragmentary vertical section taken on line 6—6, Fig. 3.
Fig. 7 is a fragmentary vertical enlarged section through the wall of the combustion chamber and showing the secondary auxiliary air inlet and a control valve therefor.

While any form of fuel can be used the generator is shown as being adapted for fuel oil which is supplied from a fuel supply pipe 85 to a carburetor 86. The air to this carburetor is preferably preheated, being withdrawn through a pipe 84 from the preheating chamber 34. The carburetor is of a standard construction used for automotive work, which is illustrated in section in Fig. 8, having the usual float valve 87 for controlling the flow of fuel to main and auxiliary jets 88 and 89, the outlet ends of which are located in a venturi 90 and a butterfly throttle valve 91 operated by a lever 92 being arranged in the outlet neck 93 of the carburetor. Similarly, a butterfly choke valve 94 for controlling the richness of the mixture is arranged in the inlet neck 95 of the carburetor and operated by a lever 96, and is set to deliver an excessively rich mixture of fuel and air so that a back fire will not ignite the fuel mixture in the inlet passage wherein sustained combustion would not only burn out the inlet parts but also render the combustion apparatus entirely inefficient. The outlet neck 93 of the carburetor is connected by a pipe section 97 with the lower end of the lower combustion chamber casing section 20. An opening 98 is provided in the lower casing section 20 from the outlet pipe 97 of the carburetor to the combustion chamber 81. In the lower end of this opening 98 a sleeve 99 is provided and on this sleeve is supported a second sleeve 100 which separates the passage 101 for the fuel mixture from the annular chamber 36 for the first stage of auxiliary air. The sleeve 100 is provided with a lower peripheral flange which rests on the sleeve 99 and is also provided with an upper peripheral flange 102 which is fitted into the opening 98. This upper flange 102 is provided with a large number of slots 103 which are helically disposed with reference to the sleeve so as to set up a whirling motion in the first stage of auxiliary air which is admitted from the air inlet 37 and annular chamber 36 through the slots into the combustion chamber. Within the sleeves 99 and 100 is arranged an inverted cylindrical cup-shaped member 104 which is open at its lower end and at its upper end is provided with a large number of helical slots 105 which extend from approximately midway of its height through its upper corners. The purpose of these slots is to impart a whirling motion to the rich mixture of fuel and air which is admitted through the carburetor and passage 101 into the combustion chamber. The slots 105 of the cylindrical cup-shaped head 104 and the slots 103 in the upper flange 102 of the sleeve 100 are disposed to incline in the same direction so that their effect in setting up a whirling motion of the burning gases within the combustion chamber is cumulative.

It will be noted that the top of the auxiliary air inlet sleeve 100 and the fuel inlet head 104 is flush with the bottom of the bowl-shaped casing section 20 and in a pocket formed in the refractory. If, in starting, an excess of fuel collects in the combustion chamber, this will flow back into this pocket and be revaporized by the auxiliary air.

Means are provided for preventing a back fire through the carburetor and for this pupose a check valve is disposed within the inverted cup-shaped head 104 which closes when a condition of back pressure exists. For this purpose a sleeve 106 is arranged inside of the cup-shaped head 104 and the upper end of this sleeve is provided with an internal bevel 107 which forms a seat for a valve 108, this valve 108 being of inverted cup-shaped form and seating with its rim against the bevel 107. In order to guide the valve 108 it is provided with an upstanding stem 109 which moves vertically in a guideway 110 in the center of the cup-shaped head 104.

The carburetor is set to deliver an excessively rich mixture and as this mixture issues from the inclined slots 105 it joins the whirling first stage of auxiliary air and is brought into contact with the ignition points of a spark plug 111. This spark plug is only needed in starting the generator and after it is once started ignition of the incoming fuel and air mixture is continuous. This spark plug 111 is arranged in a pocket 112 which opens through an opening in the refractory lining 73 into the combustion chamber. In the absence of provision to prevent it carbon is liable to form within this pocket and to avoid this condition a small groove 113 is provided in the bottom of the pocket 112 and this groove opens to the atmosphere so that at all times a small stream of air flows through this groove into the combustion chamber. This air not only cools the spark plug but also keeps the pocket 112 free from all carbon deposit.

As the burning gas travels upwardly a second stage of auxiliary air is admitted through a plurality of nozzles 120 which are set at an angle so that the auxiliary air from each nozzle issues in such direction as to continue and accelerate the helical whirling motion of the ascending burning gases. Each of the nozzles 120 is screwed into a threaded opening provided in the lower casing section 20 and extends through corresponding openings provided in the refractory liner. The inner end of each nozzle communicates with the annular auxiliary air passage 39, the admission of air to which is controlled by the butterfly valve 41.

In order to observe the operating conditions within the combustion chamber peepholes 122 and 123 are provided through the wall of the lower casing section 20. These peepholes may be made in any suitable manner and each is glazed with a disk of glass. One of these peepholes is directed at the spark plug 111 and the other is directed at the upper corner of the combustion chamber so as to observe the condition of the burning gas escaping through the slots 80. These openings are useful in securing the best operating conditions and the maximum economy in fuel consumption. It has been found that fuel oil is apt to collect in the lower peephole 123 in starting and that while the operating temperatures in the combustion chamber are high, the temperature in the peephole 123 is not high enough to vaporize this oil. This trapped fuel is therefore preferably discharged by cutting a slot or groove 124 in the glass disk of the peephole 123 so that a small stream of air is drawn into the peephole pocket and the fuel redelivered to the combustion chamber.

The water from which the steam is generated is introduced through a water supply pipe 125 under control of a diaphragm valve 126 which in turn is operated by a thermostat 127 in the exhaust pipe. This water inlet pipe feeds into the water jacket 33 around the lower combustion chamber section 20 and from this jacket the water passes upwardly through a plurality of passages 128 into the space 50 between the combustion chamber assembly and the outer shell 45 and the dome 48. These passages 128 are provided by registering holes in the lower flange 24 of the intermediate casing section 21 and in the upper part of the lower casing section 20, as best illustrated in Fig. 6. The combustion apparatus can be set to deliver any kind of steam desired or to deliver hot water by adjustment of the thermostat 127. Thus, if saturated steam is desired the water level in the space 50 is maintained as illustrated. If hot water is to be delivered the entire system, including the outlet pipe 49 and radiators are, of course, flooded. If superheated steam is desired a very low level is maintained in the space 50 so that a part of the heating surface comprising the cylindrical wall 23, the head 28 and a part of the tubes 27 are in contact with the steam and consequently superheat the steam. Further, the combustion apparatus can be operated as a flash boiler.

In order to conserve heat the entire unit is insulated. For this purpose a lining of insulation 130 is provided in the base 60 and a covering 131 of insulating material is provided around the tubular shell 45 and held in place by metal bands 132. Similarly, the dome 48 is provided with external insulation, as indicated at 133.

In the event that there is a failure in the water supply a safety device is provided for shutting down the generator and preventing burning out of the combustion chamber and tubes. For this purpose a second thermostat 135 is arranged in the exhaust pipe and controls a switch 136 in one of the power lines 137 to the blower motor 72. When the heat in the exhaust pipe rises to a danger point the thermostat 135 opens the switch 136 and deenergizes the motor 72. When this happens the combustion apparatus automatically closes down because its operation is conditioned on the maintenance of a sub-atmospheric pressure within the combustion chamber since otherwise no fuel or air would be drawn into the combustion chamber.

In order to prevent entrained water in the exhaust gases from throwing the suction fan 71 out of balance and also to prevent this water from entering the stack (not shown) if the exhaust is discharged into a chimney, a water separator 138 of any suitable construction is preferably arranged in the exhaust pipe ahead of the suction pump 71.

It will readily be appreciated that the system as shown is readily adapted for automatic control. Such an automatic control is illustrated in Figs. 8–14. In the form of the invention shown in these figures the combustion chamber is made up of a lower bowl-shaped casing section 140, a second bowl-shaped casing section 141 which rests on and is secured to the upper part of the lower casing section 140, a tubular sleeve 142 which is welded to the bowl-shaped section 141, as indicated at 143, and an upper section 144 which is bolted to the upper end of the cylindrical section 142 and from the center of which the exhaust pipe 145 extends. This exhaust pipe connects with a helical coil 146 which leads downwardly to a fitting 147, this fitting being screwed to the end of a pipe section 148 which connects with the inlet of a blower 149. The outlet 150 from the blower 149 is valved, as indicated at 151.

Figure 8:
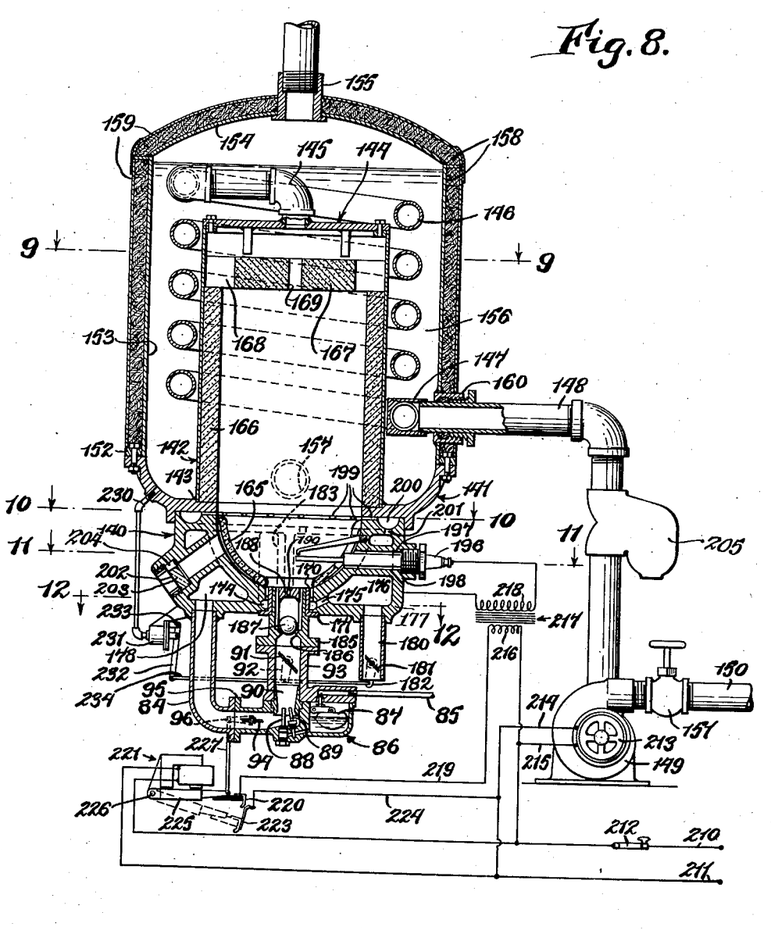
Fig. 8 is a view similar to Fig. 1 showing a modified form of my invention and showing an automatic control system therefor.
Figure 9:
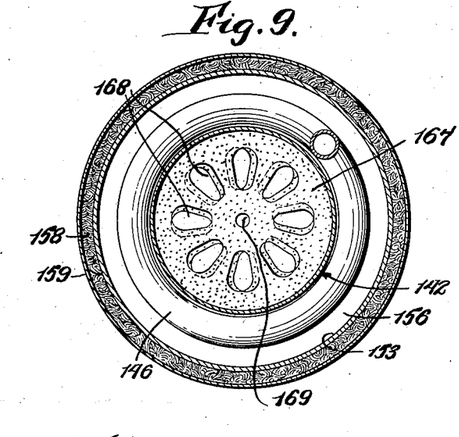
Figs. 9, 10, 11 and 12 are horizontal sections taken on the correspondingly numbered lines of Fig. 8.
Figure 10:
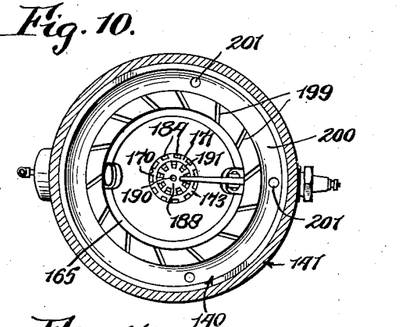

To the rim of the bowl-shaped casing section 141 is bolted a ring 152 which is welded to a cylindrical shell 153. To the upper end of this shell 153 is welded a dome 154 carrying a steam outlet connection 155. Water is introduced into the space 156 between the combustion chamber casing assembly and the outer shell through a water inlet 157 and the entire shell is insulated, as indicated at 158, and preferably also covered with sheet metal 159. In order to provide a pressure-tight joint between te exhaust pipe 148 and the boiler shell a stuffing box 160 is welded to the shell and the pipe tightly sealed by the packing in the stuffing box. The lower section 140 of the combustion chamber casing is lined with a refractory material, as indicated at 165 and the tubular shell 142 is similarly lined, as indicated at 166, and supports a circular plate 167 of refractory material having radial slots 168 which are helically disposed in the same manner as the slots 80 of the preferred construction and also having a small central opening 169 to prevent pocketing of the gas.

Figure 14:
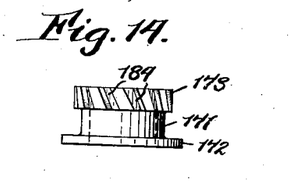
Fig. 14 is a similar view of the sleeve through which the first stage of auxiliary air is admitted to the combustion chamber.

At the lowermost end of the lower casing section 140 an opening 170 is provided and in this opening is arranged a sleeve 171 having a lower outwardly extending flange 172 and an upper outwardly extending flange 173. Around this sleeve the lower casing section is formed to provide an annular air inlet passage 174 which communicates through ports 175 with an auxiliary air inlet chamber 176 provided in one side of a jacket 177 around the lower casing section. This air inlet chamber 176 is divided from the primary air inlet preheating chamber 178 by partitions 179 and air is supplied to the auxiliary air chamber through an inlet 180 under control of a butterfly valve 181 which is operated by a lever 182. The upper flange 173 of the sleeve 171 is provided with a plurality of helical slots 184, as best illustrated in Fig. 14, so that the air issuing from the annular chamber 174 through the slots 184 is deflected to traverse a helical path and to set up a whirling motion of the gases in the combustion chamber. Within the sleeve 171 is arranged a second sleeve 185 which projects downwardly from the lower end of the combustion chamber casing section 140 and is also formed to provide an internal seat 186 on which a ball 187 rests.

Figure 13:
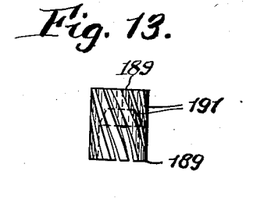
Fig. 13 is a detached side elevation of the fluted head through which the excessively rich mixture is introduced into the combustion chamber.

The upward movement of this ball is limited by a fuel inlet head 188 which is of cylindrical form and has a depending skirt 189 forming a pocket for the ball. The sides of this head are provided with a plurality of helical grooves 191 which extend entirely through the skirt so that the fuel is free to escape from the inside of the burner head to the combustion chamber and in doing so is deflected to traverse a helical path so as to set up a whirling motion of the burning gases in the combustion chamber. To prevent the ball from sticking in its up position a small hole 190 is provided through the center of the head, this hole also serving to transmit back fire pressure directly to the top of the ball 172 so that it closes instantaneously and avoids any danger of combustion continuing in the fuel inlet conduit instead of the combustion chamber although this condition is also avoided by feeding an excessively rich mixture to the combustion chamber and supplying the necessary additional air independently.

Figure 11:
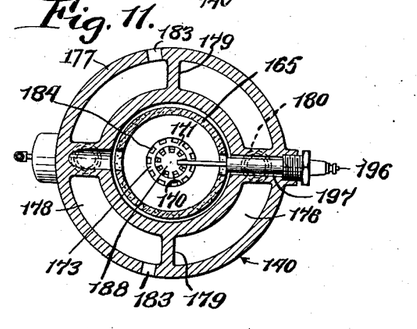
Figure 12:
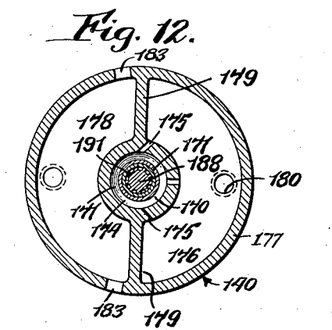
Figures 15, 16:
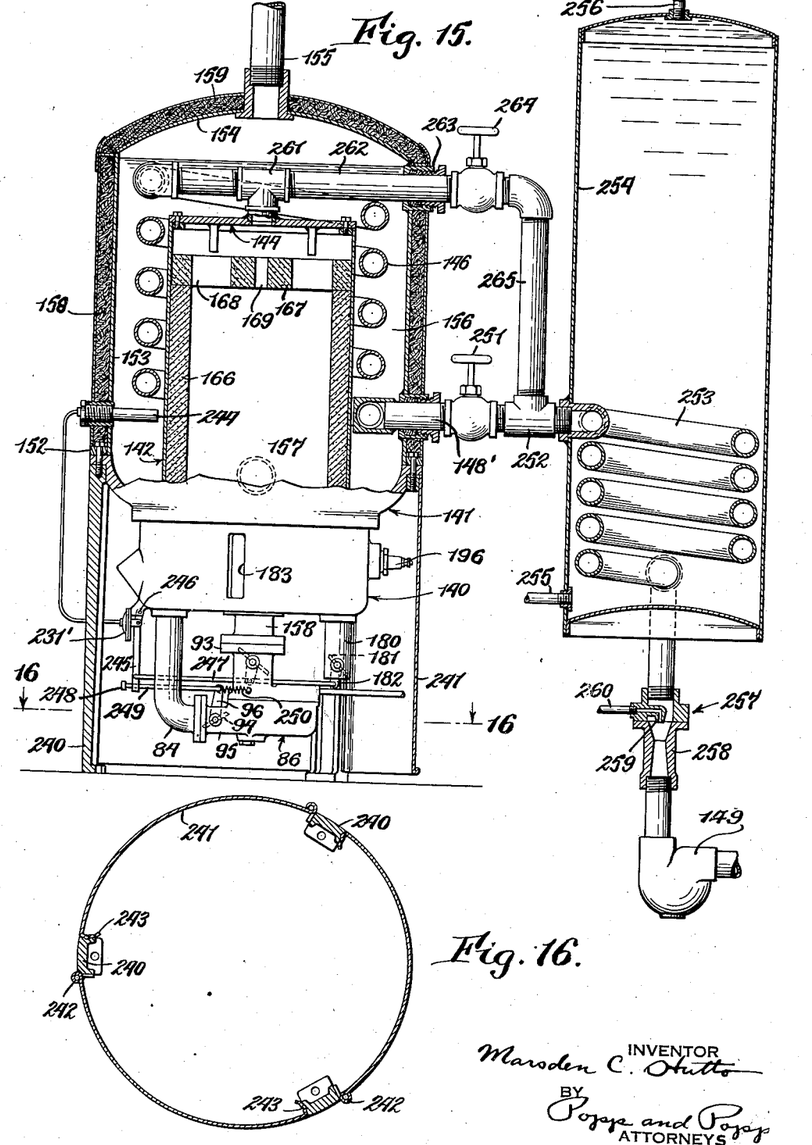
Fig. 15 is a sectional view, partly in elevation, similar to Figs. 1 and 8 and showing a further modified form of my invention.
Fig. 16 is a horizontal section taken on line 16—16, Fig. 15.

The carburetor 86 is of the same type as illustrated in the preferred form of the invention and its air inlet pipe 84 communicates with the chamber 178 on the opposite side of the partitions 179 from the chamber 176. Air is admitted to this chamber 178 through a pair of slots 183, as best illustrated in Figs. 11 and 15. The excessively rich mixture issues from the slots 191 and joins the auxiliary air issuing from the slots 184 so as to provide a combustible mixture. This mixture is ignited, in starting the combustion apparatus, by a spark plug 196, the pocket 197 for which is also preferably kept free from carbon deposits by a small vent 198 as in the preferred construction. After the burning gases pass the spark plug a second stage of auxiliary air is provided and for this purpose a plurality of slots 199 are provided in the upper face of the lower combustion chamber section 140 and lead from the combustion chamber into an annular passage 200 which is supplied with preheated air through a plurality of ports 201 which communicate with the preheating chamber 176. These slots 199 are disposed so as to sustain the upward helical whirling motion of the burning gases.

As in the preferred construction a peephole 202 containing a block of glass 203 is provided for observing the conditions within the combustion chamber and the glass is provided with a groove 204 to admit a small stream of air and prevent the formation of a pool of fuel in this peephole. A water separator 205 is also placed ahead of the pump 149, as in the preferred construction.

In the form of the invention shown in Figs. 8–14 a completely automatic control is provided so that the generator will automatically regulate itself and all that is needed in the way of attention is the opening and closing of a start and stop switch. As illustrated in Fig. 8 the numerals 210 and 211 represent two power lines in one of which a start and stop switch 212 is arranged. The motor 213 for the blower 149 is arranged across these power lines through wires 214 and 215 and the wire 215 connects with the primary winding 216 of an ignition transformer 217, the other winding 218 being grounded at one end and connecting with the spark plug 196 at its other end. The primary winding 216 is also connected by a wire 219 with the movable contact 220 of a delay relay 221. The stationary contact 223 of the delay relay is connected to the other power line 211 by a wire 224. The delay relay 221 is connected directly across the main power lines 210 and 211 and its armature 225 which carries the movable contact 220 is pivoted for vertical movement, as indicated at 226. A rod 227 is carried at the outer end of the armature 225 and the upper end of this rod connects with the arm 96 of the choke valve 94 of the carburetor.

In operation when it is desired to start the combustion apparatus the operator closes the switch 212 which establishes a circuit through the blower motor 213 so that the blower 149 exhausts the combustion chamber and draws the fuel mixture into the combustion chamber, the air for this purpose being drawn through the air inlets 183, preheating chamber 178, carburetor air inlet pipe 84, choke valve 94 which in this condition is closed to its maximum extent, venturi 90 in which fuel is admitted, and through the sleeve 185 and slots 191 into the combustion chamber. At the same time auxiliary air is admitted through the slots 184 and 199 so as to provide a combustible mixture. Coincident with the starting of the blower motor the primary winding 216 of the transformer 217 is energized, current passing from the line 210, primary winding 216, wire 219, closed contacts 220 and 223 and through wire 224 to the other power line 211. This establishes a circuit through the spark plug and the combustible mixture drawn into the combustion chamber is ignited and the generator placed in operation. Coincident with the starting of the blower motor and the establishment of ignition through the spark plug the relay 221 is energized and after a predetermined period its armature is drawn upwardly thereby breaking engagement between the contacts 220 and 223 and breaking the circuit through the primary winding 216 of the transformer 217 so as to cut out the flow of current through the spark plug 196. At the same time the raising of the armature 225 of the delay relay 221, through the rod 227, gradually opens the choke valve 94 of the carburetor, choking of the carburetor being only necessary when starting.

As the combustion apparatus continues to operate pressure is built up in the steam chamber 156 and this pressure is transmitted through a pipe 230 to a pressure motor 231 which operates an arm 232 pivoted at 233. The free end of this arm operates a rod 234 which connects with the arm 92 of the carburetor throttle and the arm 182 controlling the admission of auxiliary air to the chamber 176. When the pressure in the steam chamber 156 reaches a predetermined value the pressure motor 231 operates the rod 234 to gradually close the throttle valve 91 and auxiliary air valve 181 so as to maintain and govern the pressure in the boiler.

In the form of the invention shown in Figs. 15 and 16 the combustion apparatus is substantially the same as that shown in Figs. 8 through 14 and therefore common reference numerals have been applied to both. In Figs. 15 and 16 the combustion apparatus is mounted upon a base or standard which comprises a plurality of legs 240 to which door sections 241 are pivoted to open and close, as indicated at 242, and held closed by suitable snap latches 243. In this form of the invention the ignition is intended to operate continuously and the automatic control is thermostatic instead of a pressure control, as illustrated in Figs. 8 through 14. For this purpose the damper motor 231', which corresponds to the pressure motor 231 in the form shown in Figs. 8 through 14 is actuated by a thermostat 244 and this motor operates an arm 245 which is pivoted at 246 and the free end operates a rod 247 which controls the main throttle valve of the carburetor and the auxiliary air inlet valve so that when the temperature in the boiler rises to a predetermined setting these valves will be gradually closed to maintain the desired operating conditions of the generator. When the generator cools down completely the arm 245 of the motor 231' strikes a button 248 at the outer end of a rod 249 which connects with the arm 96 of the carburetor choke valve. This valve is normally held open by a spring 250. It is therefore apparent that when the generator is cold the choke valve is closed and in condition for prompt starting. As soon, however, as the generator warms up the arm 245 releases the button 248 and permits the choke valve to open.

In the form of the invention shown in Figs. 15 and 16 the heat of the exhaust gases which is not absorbed in the main boiler is utilized for heating water for domestic use. For this purpose the exhaust pipe 148', which corresponds to the pipe 148 in the form of the invention shown in Figs. 8 through 14, is provided with a valve 251 which connects through a T 252 with the coils 253 in a hot water tank 254. Water is admitted to this tank through an inlet pipe 255 and withdrawn through an outlet pipe 256 and the other end of the coil extends through the side of the tank 254 and connects with an ejector illustrated generally at 257. This ejector includes a venturi 258 and a nozzle 259 to which steam or air is supplied from a pipe 260. The nozzle and venturi serves to draw the products of combustion from the combustion chamber and through the coils 146 and 233 and to maintain the necessary sub-atmospheric pressures within the combustion chamber.

When the exhaust is drawn through both the coils 146 and 253, it is cooled to a very low temperature, lower, in fact, than the preheated air drawn into the combustion chamber and consequently condensation of water in the exhaust takes place and the water must be eliminated. Where a steam or air jet is used for exhausting, a water separator 149 is located in the exhaust pipe after the jet and if a fan were used it would be located ahead of the fan as in the other forms of the invention.

Where the generator is used for domestic heating it is unnecessary to heat the house during the summertime and at the same time it is desirable to have a copious supply of hot water for domestic use. For summer operation a T 261 is substituted for the outlet elbow 145 at the top of the combustion chamber and this T in addition to connecting with the coil 146 also connects with a pipe 262 which extends directly out through a stuffing box 263 and connects with a valve 264 and a pipe 265 leading to the T 252. When heating of the house is not desired the valve 251 is closed and the valve 264 is opened and therefore the exhaust gases instead of exhausting through the coil 146 and heating the water in the main boiler 156 to a high temperature pass directly to the coil 233 so as to heat the water in the tank 254 for domestic purposes. It will be understood that the heat necessarily absorbed by the water in the main boiler 156 can be utilized by connecting this boiler with the inlet 255 to the tank 254.

While I have shown several modifications of my invention it will be appreciated that the invention is capable of wide variation in practice and the invention is not to be construed as specifically limited to the constructions shown and described but is to be accorded the full range of equivalents comprehended by the accompanying claims.

I claim as my invention:

1. Combustion apparatus of the character described, comprising means forming a combustion chamber provided with an inlet opening, a sleeve in said inlet opening and forming an internal fuel inlet opening and an external annular auxiliary air inlet opening, means for continuously admitting fuel through said fuel inlet opening, means for continuously admitting auxiliary air through said auxiliary air inlet opening, means for igniting the fuel and air in said combustion chamber, means for exhausting the products of combustion from said combustion chamber and a check valve in said fuel inlet opening.

2. Combustion apparatus, comprising means forming a combustion chamber provided with a fuel inlet opening in said combustion chamber and means in said fuel inlet opening for directing the issuing stream of fuel into a helical path on entering said combustion chamber, means for admitting air to said combustion chamber for admixture with said fuel and including means for directing the issuing stream into a helical path on entering said combustion chamber, means for igniting the fuel in said combustion chamber, and means at the opposite end of said combustion chamber from said fuel inlet opening for exhausting the products of combustion therefrom, said exhausting means creating a sustained subatmospheric pressure in said combustion chamber.

3. Combustion apparatus, comprising means forming a combustion chamber provided with a fuel inlet opening, a carburetting device having its outlet connected to said fuel inlet opening, means for admitting fuel and aid to said carburetting device for mixture therein, means for drawing the air and fuel through said carburetting device and fuel inlet opening into said combustion chamber, a member in said fuel inlet and having a helical groove for directing the issuing stream of fuel laterally and to create a turbulence therein, means for igniting the mixture in the combustion chamber and means for exhausting the products of combustion therefrom.

4. Combustion apparatus of the character described, comprising means forming a combustion chamber provided with a fuel inlet opening, means in said fuel inlet opening for directing the issuing stream of fuel into a helical path on entering said combustion chamber, said combustion chamber being provided with an air inlet for admitting a stream of air into said fuel stream from the outside thereof, means in said air inlet for directing the air entering said combustion chamber into a helical path and whirling in the same direction as said fuel stream, means for igniting the fuel and air in said combustion chamber and means at the opposite end of said combustion chamber from said fuel inlet opening for exhausting the products of combustion.

5. Combustion apparatus of the character described, comprising means forming a combustion chamber provided in its bottom with a fuel inlet opening, means in seaid fuel inlet opening for directing the issuing stream of fuel into a helical path on entering said combustion chamber, said combustion chamber being also provided with an annular air inlet orifice adjacent to and surrounding said fuel inlet for admitting air to said combustion chamber, means in said air inlet orifice for directing the air from said orifice into a helical path and to whirl in the same direction as said fuel stream, means for igniting the fuel and air in said combustion chamber, said combustion chamber being provided with a second annular air inlet coaxial with said fuel inlet to supply auxiliary air to the stream of burning fuel, means in said second air inlet to deflect the issuing air into a helical path and to whirl in the same direction as said fuel stream, an exhaust outlet at the opposite end of said combustion chamber from said fuel inlet and means for drawing the fuel and air into said combustion chamber and exhausting the products of combustion therefrom.

6. Combustion apparatus of the character described, comprising means forming a combustion chamber having a smooth bowl shaped bottom the sides of which drain into a fuel and air inlet opening provided in the bottom of said combustion chamber, a carburetting device arranged below said combustion chamber and having its outlet connected to said inlet opening, means for preheating a supply of primary air, means for continuously delivering said preheated air and an excess of fuel to said carburetting device whereby a continuous excessively rich and incombustible fuel mixture is delivered through said inlet opening at high temperature to said combustion chamber, means for continuously admitting secondary air to said combustion chamber for admixture with the excessively rich fuel mixture therein to dilute said excessively rich mixture, means for igniting said diluted mixture, means for admitting additional air to said combustion chamber for admixture with said ignited mixture and means for exhausting the products of combustion therefrom.

7. Combustion apparatus of the character described, comprising means forming a combustion chamber provided in its bottom with a fuel mixture inlet opening, means for continuously supplying fuel through said fuel inlet opening, said combustion chamber being provided in its bottom with an annular air inlet opening adjacent to and surrounding said fuel inlet opening and continuously and independently admitting air for admixture with said fuel, means for igniting the fuel and air mixture, said combustion chamber being provided in its side with a second annular air inlet opening arranged remote from said fuel inlet opening and substantially coaxial therewith and continuously and independently admitting air for admixture with the burning fuel and means for exhausting the products of combustion in a sustained stream from said combustion chamber.

8. Combustion apparatus of the character described, comprising means forming a combustion chamber provided in its bottom with an inlet opening, a sleeve arranged in said inlet opening and provided with an internal fuel inlet opening and an external annular auxiliary air inlet opening, the upper part of said sleeve being substantially flush with the bottom of said combustion chamber, means for supplying an excessively rich and incombustible mixture of fuel and air through said fuel inlet opening, means for supplying auxiliary air through said auxiliary air opening for dilution of said excessively rich mixture, means in said combustion chamber for igniting said diluted mixture and means for exhausting the products of combustion from said combustion chamber.

9. Combustion apparatus of the character described, comprising means forming a sealed combustion chamber, an exhaust pipe sealed thereto for the gaseous products of combustion and forming a heat exchanger, means connected with said exhaust pipe for exhausting said combustion chamber and maintaining a sub-atmospheric pressure therein, means for admitting liquid fuel and atmospheric air to said combustion chamber under atmospheric pressure and means remote from said combustion chamber for controlling the admission of both said fuel and said air, comprising an externally actuated valve in said exhaust pipe, said products being substantially cooled before passing said valve.

10. A combustion apparatus of the character described, comprising means forming a sealed combustion chamber, an exhaust pipe sealed thereto for the gaseous products of combustion and forming a heat exchanger, means connected with said sealed exhaust pipe for exhausting said combustion chamber and maintaing a subatmospheric pressure therein, means for admitting an excessively rich mixture of liquid fuel and atmospheric air to said combustion chamber under atmospheric pressure, means for admitting secondary air under atmospheric pressure to said combustion chamber to dilute said excessively rich mixture of fuel and air and means for controlling the admission of both said fuel and said air, comprising an externally actuated valve in said exhaust pipe, said products being substantially cooled before passing said valve.

MARSDEN C. HUTTO.